United States Patent [19]

Ito

[11] Patent Number: 4,515,325

[45] Date of Patent: May 7, 1985

[54] FLY REEL

[75] Inventor: Takeshi Ito, Nagano, Japan

[73] Assignees: Coret & Co. Ltd., Tokyo; Machine Engineering Co., Ltd., Nagano, both of Japan

[21] Appl. No.: 436,478

[22] Filed: Oct. 25, 1982

[51] Int. Cl.$^3$ .............................................. A01K 89/02
[52] U.S. Cl. .................. 242/84.51 R; 242/99
[58] Field of Search ............ 242/84.5 R, 84.5 A, 242/84.51 R, 84.53, 99, 220, 211–219; 192/12 B, 14, 17 R, 18 R, 19, 44, 45, 46

[56] References Cited

U.S. PATENT DOCUMENTS

| 683,940 | 10/1901 | Howe | 242/84.53 |
|---|---|---|---|
| 2,176,247 | 10/1939 | Coxe | 242/84.51 R |
| 2,180,566 | 11/1939 | Thompson | 242/84.51 R |
| 2,551,567 | 5/1951 | Reyburn | 242/84.51 R |
| 2,569,322 | 9/1951 | Mayhew | 242/84.51 R |
| 2,986,355 | 5/1961 | Sarah | 242/84.5 R |
| 3,510,083 | 5/1970 | Cook | 242/84.51 R |
| 3,574,339 | 4/1971 | Sarah | 242/84.5 A |
| 3,708,137 | 1/1973 | Jones | 242/84.5 R |

FOREIGN PATENT DOCUMENTS

| 258613 | 4/1965 | Australia | 242/84.5 R |
|---|---|---|---|
| 859842 | 1/1961 | United Kingdom | 242/84.1 R |

Primary Examiner—Billy S. Taylor
Attorney, Agent, or Firm—Sughrue, Mion, Zinn Macpeak & Seas

[57] ABSTRACT

A fly reel is provided with a pivotable brake structure and a roller clutch between the brake and the spool. A clicking sound generating mechanism is provided which is operable to generate a sound when the spool is rotated in either the pay-out or winding directions. The mechanism is manually removable and reversible for silent operation or selective clicking in either direction. The roller clutch contains removable and reversible springs for converting the reel braking action between left-handed and right-handed modes of operation.

3 Claims, 13 Drawing Figures

FLY REEL

BACKGROUND OF THE INVENTION

The present invention relates to an improvement in a fly reel, in which a clutch operates in a direction paying out a fishing line to allow an adjustable braking power to operate on a spool, and where the clutch is disengaged in the direction winding the fishing line, so as to make it possible to turn the spool with light force.

Since the brake is adjustably supported on a frame, a brake wheel and spool are coaxially and rotatably supported, and a ratched mechanism which comprises a pawl and ratchet wheel is interposed between the spool and the brake wheel in accordance with conventional fly reel constructions. A clicking sound due to the collision of the pawl and the teeth of the ratchet wheel is always developed in rotation in the winding direction of the spool. Hence, the conventional structure was not suitable for persons who dislike the ratchet noise. In fly fishing, however, there are also many people who desire this sound to be developed in rotation in the payout direction of the spool, which desire has not been satisfied. In addition, there are persons whose right hands are more skillful than their lefts and vice versa. Depending upon whether the right or left hand is more adept, different structures are desired. Further, in prior constructions, it was impossible to switch between such different structures using common parts.

SUMMARY OF THE INVENTION

The present invention has been proposed in view of the foregoing deficiencies in the art, and is characterized in that a sound making portion which develops sound due to the rotation of the spool is provided separately from the clutch, and a noiseless clutch is provided, thereby making it possible to select the direction of sound generation using the same parts.

The present invention has been proposed with a first object of obtaining a fly reel which does not develop sound by the rotation of the spool per se and with a second object of providing parts which are common to fly reels for right handed and left handed persons. A recessed portion is formed in a brake wheel which is rotatably supported on a frame, a clutch wheel which rotates integrally with the spool is positioned in this recessed portion, at least one of the outer periphery of the clutch wheel and the peripheral wall of the recessed portion of the brake wheel is made alternately recessed and protruded, and the width of the annular gap between the two is varied in such a way as to become larger or smaller, a roller which has an intermediate gap width is inserted into this gap, and there is provided a clutch which pushes the rollers in the small gap width direction by means of an elastic member such as spring supported by the brake wheel, thereby achieving the above mentioned objects. This construction has made it possible for sound to be selectively developed at the clutch portion in either direction (in the direction releasing the fishing line as well as in the direction winding the fishing line).

On the other hand, there are provided two sound generating wheels, the outer periphery of which is gear like (recessed and protruded), between the brake wheel and the clutch wheel. One of the gear wheels is unable to rotate while the other is capable of rotating integrally with the clutch wheel. A sound generating member which comes in contact with at least one of the sound making wheels by means of an elastic energizing means is provided and can be formed or positioned in such a way as to enable selection of the rotational operational direction of the sound making portion supported on the brake wheel, so as to develop a clicking noise.

DETAILED DESCRIPTION OF THE PREFERRED EMBODIMENTS

Figure 5:
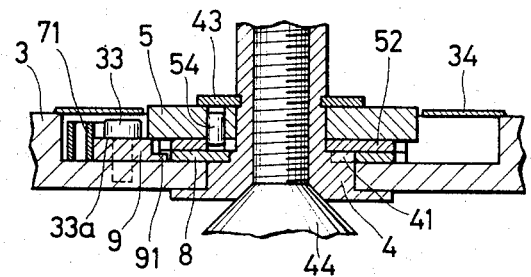
FIG. 5 is a partial cross sectional view taken along the line B—B of FIG. 3.
Figure 6:
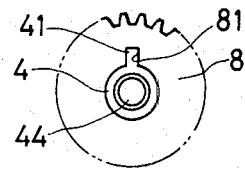

With reference to FIGS. 1–6, there is shown a spool shaft 4 fixed via a screw 44 at the center of a circular frame 1 which is provided with a shoe integrally therewith. Reference numeral 12 denotes an outer cover therefor, which is fitted in the frame. A brake wheel 3 is rotatably fitted onto the spool shaft 4. A sound making gear 8 is fitted in a recessed portion of the wheel 3 in such a way as to be unable to rotate due to coupling portions 41 and 81 as shown in FIG. 6. This may be a D-type coupling or the like. A clutch wheel 5 is rotatably fitted in the recessed portion at the right (FIG. 2) of the gear 8 and is prevented from moving out of position by means of a U-ring 43. A sound making gear 52 is provided in such a way as to be integral with the clutch wheel 5 by means of a pin 54. In addition, a spool 6 is rotatably fitted to the spool shaft 4. Pins integral with the spool 6 are fitted into holes 52 of the clutch wheel 5 so that they become integral with each other in the direction of rotation. A plate 67 is fitted to a neck 42 of the shaft 4 so as to prevent the spool 6 from getting out of position. This plate 67 is slidably fitted between the spool 6 and a cover 65 which is integral therewith and urged towards the center by means of a spring 68. A pin 66 passes through a hole 65a an such a way as to regulate the direction of movement of the plate 67. The frame 1 supports a U-shaped brake 2 with an eccentric pin 23 and an adjusting knob 22, and brake shoes 21 are in contact with the outer periphery of the brake wheel 3.

The peripheral wall 31 (FIG. 3) of the recessed portion of the brake wheel 3 is of a gentle wave form and consists of three continuous recesses and protrusions. The width of the annular gap formed between the peripheral wall 31 of wheel 3 and the outer periphery 51 of the clutch wheel 5 is varied in such a way as to become alternately larger or smaller. Three rollers 7, each of which is of a diameter intermediate the maximum and minimum widths of the gaps, are idly fitted in this gap and urged in the direction of smaller widths by one end 71a of a spring 71. The positions of the springs 71 are determined by two pins 32 which are fixed on the wheel 3 at the large gap width portion. At one location of the spring 71, two guide pins 33 are fixed to the wheel 3 in such a way that a sound making member 9 is prevented from being shifted out of position by means of a guide head portion 33a. The member 9 is pushed against the gear 8 by the other end 71b of the spring. The end 91 of the sound making member 9 is cut off at one side thereof so as to be in contact with only one of gears 8 and 52. In FIG. 5, it is in contact with the gear 8. Reference numeral 34 denotes a cover which closes the recessed portion of the brake wheel 3 and which is fitted to the wheel 3 (fitted to the outer periphery with an erected piece which is not shown) so as to prevent the rollers 7 and the springs 71 from getting out of position.

A flange 61 is integrally formed on the spool 6, and a flange 62 is threadedly connected therewith at the central side. The latter is pushed with a cover 65 which is made integral therewith by means of a screw 64. A handle 69 is mounted onto the flange 62. Reference numeral 63 denotes a slide bearing which is pressed into the central hole of the spool 6. Reference numeral 92 denotes a recessed curve surface at either side of the sound making member 9 which is formed in such a way as to contact the guide pins 33.

Now, explanation will be made in respect to another embodiment of the brake structure in accordance with the present invention.

The fly reel is constituted in this embodiment such that the braking force applied to the spool may be adjusted by an operative member such as a knob or the like. It is desirable that the variance of the brake force be smooth, so that sticking is not caused when the fishing line is let out.

Figure 1:
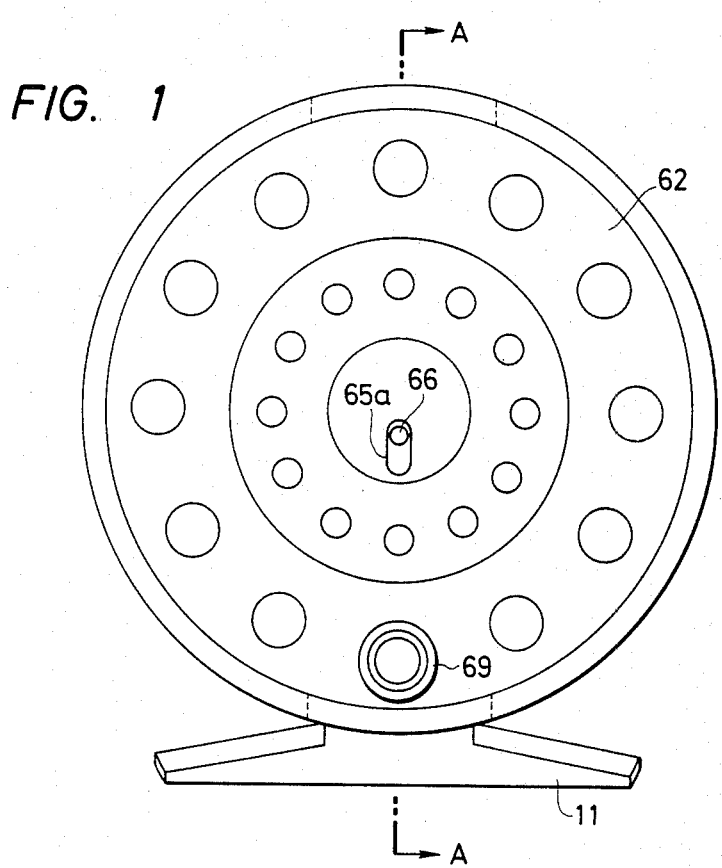
FIG. 1 is a plan view showing one embodiment in accordance with the present invention.
Figure 3:
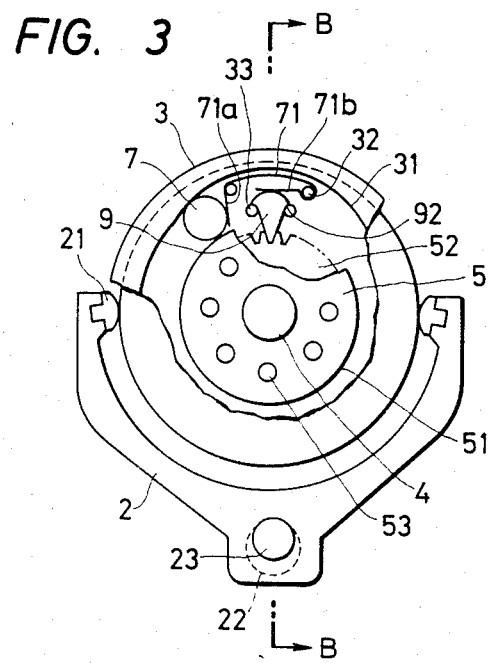
FIGS. 3, 4 and 6 are partial explanatory views thereof.
Figure 4:
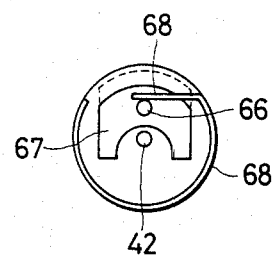
Figure 2:
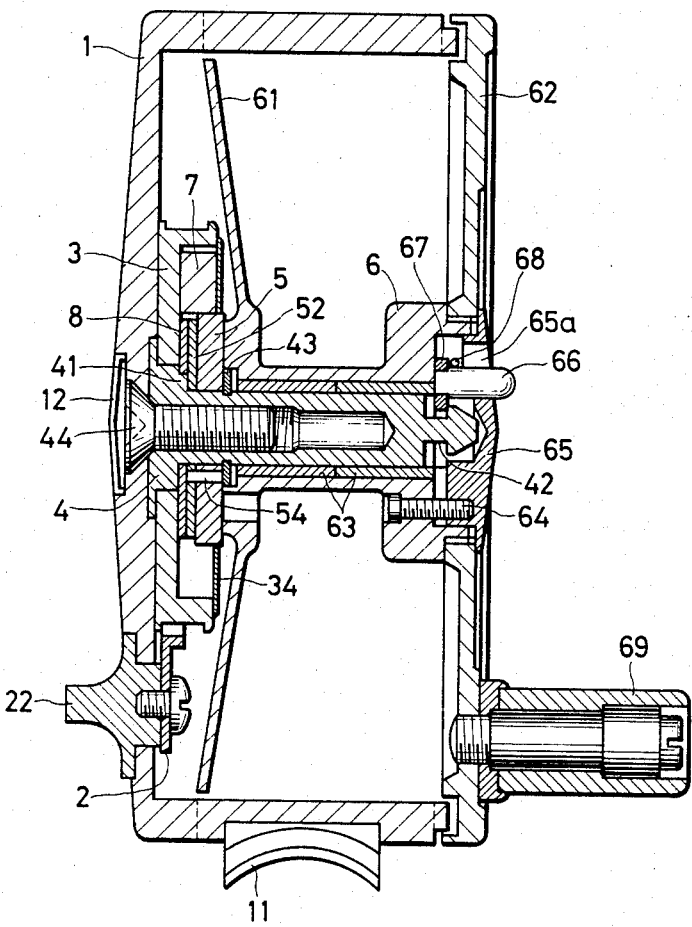
FIG. 2 is a cross sectional view taken along the line A—A of FIG. 1.

On the other hand, in accordance with the embodiment shown in FIG. 3, the construction is such that the brake shoes 21 fixed at the inner periphery of both ends of the U-shaped brake arm 2 are pressed against the brake wheel 3 like a drum which rotates integrally with the spool 6 at the time of rotation in the direction in which the brake functions, and the brake arm 2 is displaced by the knob 22 fixed onto the frame so as to adjust the brake power in order to simplify the brake structure.

Stability is achieved at the initial stages in accordance with this construction, but since the position at which the brake shoe comes into contact with the brake wheel is varied in correspondence with the displacement of the brake arm, the adjustment of the brake power becomes unsmooth during the use thereof. Also, there is the probability sticking will be caused when the fishing line is let out.

Figure 11:
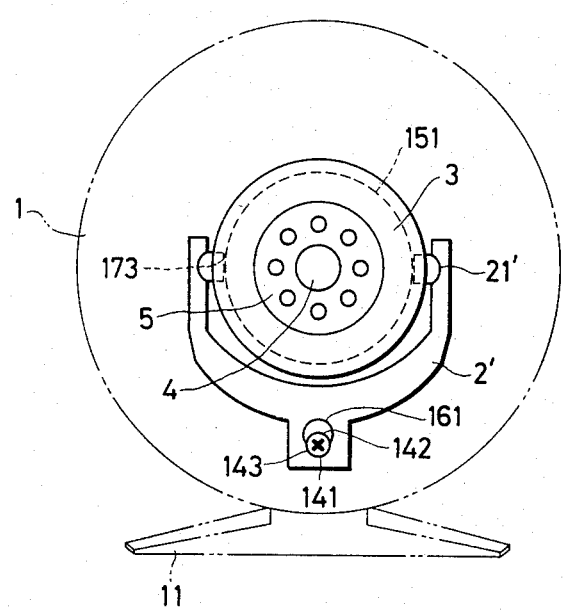
FIG. 11 is a plan view showing an example of the brake structure in accordance with the present invention.
Figure 12:
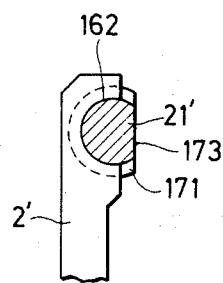
FIG. 12 is a partial view showing an arm.
Figure 13:
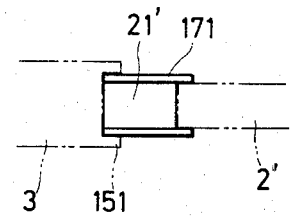
FIG. 13 is an explanatory view showing the side of a brake shoe.

In accordance with the second embodiment shown in FIG. 11–FIG. 13, the brake shoe is rotatably supported so that the brake shoe rotates when the brake arm is displaced. The portion of the brake shoe which comes into contact with the brake wheel becomes constant, thereby making it possible to smoothly effect adjustment of the brake over a long term and avoid sticking.

In FIGS. 11-13, the knob 22 for adjusting the brake power is rotatably supported by a shaft 141. An eccentric portion 142 integral with the shaft 141 is fitted into a hole 161 provided at the base portion of the U-shaped brake arm 2'. A threaded hole is formed in the shaft 141 and the brake arm 2' is clasped by the screw 143, thereby making it possible to prevent the arm 2' from rising and prevent the knob 22 from getting out of position. The brake wheel 3, the clutch wheel 5 and the spool 6 are respectively rotatably supported on the shaft 4. The clutch wheel 5 engages the spool 6 so as to rotate integrally therewith. One way transmission is provided between the clutch wheel 5 and the brake wheel 3, so that the brake wheel 3 rotates integrally with the clutch wheel 5 only in the direction in which the brake functions. There are formed arc-like cut-out portions 162 at the inside of the brake arm 2' on either side. The brake shoes 21' are rotatably fitted in these arc-like cut-out portions 162.

That is, the outer peripheral arcuate surface of the shoe 21' is fitted between collar portions 171, 171 provided at the upper and lower positions of the shoe 21', so that movement thereof in an upper as well as lower direction is regulated by the collar portions 171.

The brake surface 173 of the shoe 21' comes into contact with the peripheral surface 151 of the brake wheel 3, and the movement thereof in upper and lower directions is regulated by the collar portions 171. The arm 2' has a given elasticity, and this elastic force contributes to whether the braking power is strong or weak.

The arm 2', the wheels 3 and 5 are positioned between the frame 1 and the spool 6. If the knob 22 is turned, the brake arm 2', which is fitted in the hole 161 in such a way as to be eccentric with respect to the shaft 141, moves up and down in FIG. 11. The brake shoes also move up and down accordingly, so that the position of contact with the brake wheel 3 is varied, in such a way that the clasp distance (span of the arm 2') is varied and thus the brake power is varied. Since the brake shoe 21' is fitted in such a way as to be rotatable with respect to the arm 2' with the up and down movement of the arm 2', the position where the brake surface 173 comes into contact with the wheel 3 is always kept constant.

Hence, the position where the brake surface 173 is worn is determined so as not to cause a wave-like surface, thereby making it possible to smoothly effect brake adjustment. In addition, sticking is not caused. Various materials such as resins and metal can be used for the brake shoe to achieve the effect in accordance with the present invention.

As far as the relationship beween the brake shoe and the brake arm is concerned, it is acceptable if they are relatively rotatable. The object can be achieved if the frictional force at the rotating portion due to the frictional force between the brake shoe and the brake wheel at the time of displacement of the brake arm is small. It is also possible to reverse the recess and the protrusion on the shoe and the arm, and make the arc on one guide surface large in comparison with that on the other guide surface. Hence, various modifications are possible.

Now, an explanation will be given in respect of the operation of the reel devices with reference to FIG. 7.

Figure 7:
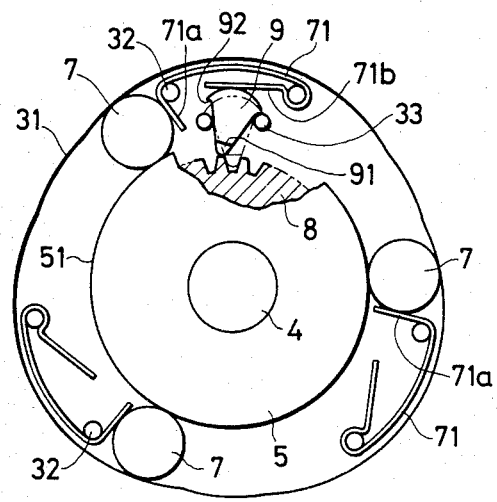
FIGS. 7, 8, 9 and 10 are explanatory views of reel operation.

FIG. 7 shows a fly reel for a right-handed person. This fly reel is constructed in such a way as to develop a clicking sound when the sound making member 9 collides against the gear 8 when the spool 6 lets out the line.

If the spool 6 is rotated clockwise (in the winding direction) with the handle 69, the clutch wheel 5 rotates therewith. Then, since the rollers 7 are subjected to a force in the same direction (in the increasing width direction of the annular gap), the rotation is not transmitted to the brake wheel 3, thereby making it possible to easily rotate the spool 6. Since the brake wheel 3 does not rotate by this rotation and the sound making member 9 does not move, sound is not developed. On the other hand, if the spool 6 is rotated counter-clockwise, the clutch wheel 5 tries to move the rollers 7 in the decreasing width direction of the annular gap. As a consequence, the rollers 7 are urged into this gap like a wedge, so as to integrally rotate the brake wheel 3. The brake 2 then operates on the rotation of the spool 6, and the brake force can be adjusted in such a way as to become larger or smaller as the eccentric pin, e.g. 23 is eccentrically moved by the adjusting knob 22 so that the brake 2 is moved up and down in FIG. 3. Since the sound making member 9 also moves due to the rotation of the wheel 3, the click sound is developed in the line pay-out direction as member 9 impacts the teeth formed on the outer periphery of the sound making gear 8 by the force of the spring end 71b.

Figure 8:
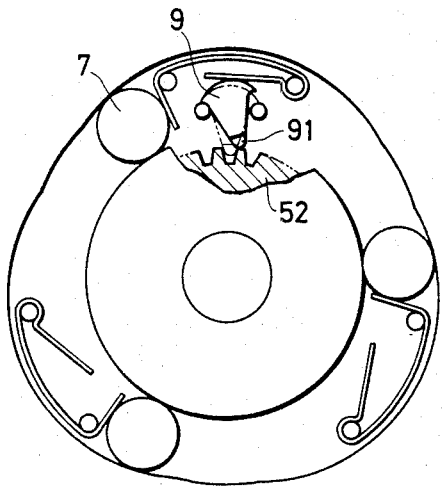

In FIG. 8, the sound making member 9 is turned over (removed and reversed) and the end 91 is brought into contact with the sound making gear 52. In contrast with the case shown in FIG. 7, the click sound is now developed during clockwise rotation (in the winding direction) of the spool 6. That is, when the clutch is out of engagement, the gear 52, which is integral with the clutch wheel 5, rotates. Since the brake wheel 3 is stationary, the sound making member 9 is also stationary. By the rotation of the gear 52, the member 9 reciprocates between the solid line and the phantom lines, developing the clicking sound. If the gears 52, 8 and the sound making member 9 are made of a hard metal, a better clicking sound is developed.

If the positions of the rollers 7 and the springs 71 are reversed in FIGS. 7 and 8, reel operation is reversed, thereby making it possible to easily form a left-handed reel.

Figure 9:
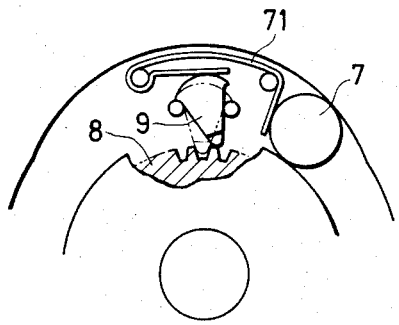
Figure 10:
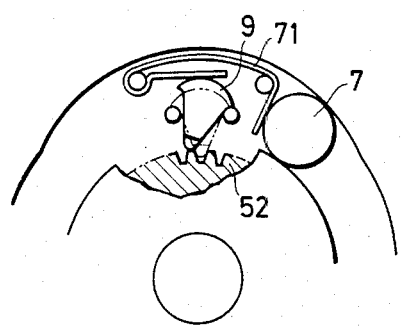

In FIGS. 9 and 10, the positions of the roller 7 and the spring 71 are reversed to form a fly reel for use by a left-handed person. The rollers 7 wedge into the small width direction of the annular gap with the clockwise rotation of the spool 6, so that rotation is transmitted to the brake wheel 3, resulting in the line pay-out direction. On the other hand, if the spool 6 is rotated counterclockwise, rotation is not transmitted to the brake wheel 3, making it possible for the spool 6 to be easily turned in the winding direction. The sound making apparatus is the same as in FIGS. 7 and 8. The click sound is developed in the pay-out direction in FIG. 9 and in the winding direction in FIG. 10.

As will be clearly understood from the above explanation, there are provided a clutch portion which does not itself develop sound, and a sound making portion with which it is possible to select the sound making direction in accordance with the present invention. In addition, the sound making member of the invention is a common part irrespective of whether the reel is right- or left-handed or whether the noise is to be generated in the pay-out or winding directions. The present invention brings about an effect such that there is employed a roller clutch which functions as a wedge in only one direction between the spool and the brake wheel so as to remove the generation of the sound, and it is possible to provide for both right-handed and left handed using only common parts by merely reversing the springs and the rollers. In addition, if there are provided circumferentially a plurality of rollers with an equal interval therebetween, the rotational balance is improved.

It is also acceptable if the recesses and protrusions in the wave form or the like are provided on the outer periphery of the clutch wheel, and the configuration of the roller is not limited to that shown in the two embodiments. In addition, the means for urging the rollers is not limited to a plate spring, and it is possible to use other elastic means such as rubber elements.

If the sound making member is simply removed, a noiseless reel is obtained. Also, if the sound making member is brought into contact with both sound making wheels, it becomes possible to develop the click sound in both directions.

The brake arm with the brake shoes is displaced by the operation of a knob or the like provided on the frame, and the position of the shoe where it comes into contact with the brake wheel is displaced. Since the brake shoe can be rotatably fitted to the brake arm and supported in so doing, the brake shoes can move in such a way as to adjust the positions thereof, resulting in smoother brake adjustment and prevention of line sticking.

What is claimed is:

1. In a fly reel wherein a brake is supported on a frame, a brake wheel and a spool are coaxially supported on a shaft, and a one way clutch is interposed between the brake wheel and the spool, the improvement comprising; a clutch wheel rotating integrally with the spool, a recessed portion inside the brake wheel, said clutch wheel being positioned inside said recessed portion, at least one of the outer periphery of the clutch wheel and the peripheral wall of the recessed portion of the brake wheel including recessed and protruded portions, so that the width of an annular gap formed therebetween varies to become larger and smaller, roller means having an intermediate width with respect to the minimum and maximum widths of said annular gap and being inserted into said gap, reversible spring means for urging said roller means in the small width direction of said gap, and mounting means on said brake wheel for selectively mounting said spring means in one of two positions for right-handed and left-handed, respectively, operation of the reel, the directions of urging being in opposite directions for the two positions, whereby in one rotational direction the clutch wheel is engaged by the brake wheel, and in the opposite rotational direction the clutch wheel is disengaged from said brake wheel, the rotational directions being different for said two positions of said spring means.

2. A fly reel as claimed in claim 1, further comprising a brake arm carrying a pair of brake shoes, said brake shoes being pivotally mounted on the brake arm, and manually operated means on the reel for displacing said brake arm to vary a braking force exerted on said brake wheel by said brake shoes at substantially diametrically opposite points on the outer circumference of said brake wheel.

3. A fly reel as claimed in claim 1, comprising first and second adjacent sound-making gears mounted on said shaft and between said brake and clutch wheels, said first soundmaking gear being fixed against rotation and said second soundmaking gear rotating with said clutch wheel, a removable clicker mounted on said brake wheel and biased by said spring means into engagement with only said first gear for a first mounting position of said clicker, and biased into engagement with only said second gear for a second mounting position of said clicker, said clicker producing a clicking noise in said first mounting position only when said brake wheel is engaged by said clutch wheel in the pay-out direction of the spool, and said clicker producing a clicking noise in said second mounting position only when said brake wheel is disengaged from said clutch wheel in the winding direction of the spool.

* * * * *